US011129209B2

(12) United States Patent
Carlsson et al.

(10) Patent No.: US 11,129,209 B2
(45) Date of Patent: Sep. 21, 2021

(54) COST EFFICIENT PRACH DETECTION

(71) Applicant: Telefonaktiebolaget LM Ericsson (publ), Stockholm (SE)

(72) Inventors: Torsten John Carlsson, Lund (SE); Torbjörn Wigren, Uppsala (SE); Henrik Sahlin, Mölnlycke (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/055,575

(22) PCT Filed: May 16, 2018

(86) PCT No.: PCT/EP2018/062636
§ 371 (c)(1),
(2) Date: Nov. 14, 2020

(87) PCT Pub. No.: WO2019/219180
PCT Pub. Date: Nov. 21, 2019

(65) Prior Publication Data
US 2021/0120593 A1   Apr. 22, 2021

(51) Int. Cl.
*H04W 74/08* (2009.01)
*H04B 7/08* (2006.01)
(52) U.S. Cl.
CPC ...... *H04W 74/0833* (2013.01); *H04B 7/0848* (2013.01)
(58) Field of Classification Search
CPC ................. H04W 74/0833; H04B 7/0848
USPC ...................................................... 370/329
See application file for complete search history.

(56) References Cited

U.S. PATENT DOCUMENTS

| 10,498,369 B2 | 12/2019 | Tidestav et al. |
| 2015/0365975 A1 | 12/2015 | Sahlin et al. |
| 2017/0006638 A1 | 1/2017 | Sahlin et al. |
| 2017/0331670 A1 | 11/2017 | Parkvall et al. |

(Continued)

OTHER PUBLICATIONS

Ericsson, "R1-1706014: NR PRACH design and evaluations," Third Generation Partnership Project (3GPP), TSG-RAN WG1 Meeting #88bis, Apr. 3-7, 2017, 40 pages, Spokane, WA, USA.

(Continued)

*Primary Examiner* — Angel T Brockman
(74) *Attorney, Agent, or Firm* — Withrow & Terranova, PLLC

(57) ABSTRACT

A base station for detecting a Physical Random Access Channel (PRACH) transmission from a User Equipment device (UE) comprises a radio device and at least one additional device. The radio device comprises narrowband receivers respectively coupled to antenna elements of an antenna array. Each narrowband receiver is configured to receive a signal from a respective antenna element and process the signal to provide received symbols for a PRACH received via the respective antenna element. The radio device also comprises accumulation circuitry configured to, for each antenna element, accumulate a subset of the received symbols for the PRACH received via the antenna element to output a first averaged symbol for the PRACH received via the antenna element. The at least one additional device is configured to receive, from the radio device, the first averaged symbols and process the first averaged symbols to perform PRACH detection for one or more receive beams.

25 Claims, 9 Drawing Sheets

(56) References Cited

U.S. PATENT DOCUMENTS

2018/0049238 A1   2/2018   Frenne et al.

OTHER PUBLICATIONS

Ericsson, "R1-1706015: NR four-step random access procedure," Third Generation Partnership Project (3GPP), TSG-RAN WG1 Meeting #88bis, Apr. 3-7, 2017, 7 pages, Spokane, WA, USA.

Ericsson, "R1-1714047: Consideration of PRACH Configuration in NR," Third Generation Partnership Project (3GPP), TSG-RAN WG1 Meeting #90, Aug. 21-25, 2017, 5 pages, Prague, Czech Republic.

International Search Report and Written Opinion for International Patent Application No. PCT/EP2018/062636, dated Jan. 24, 2019, 12 pages.

COST EFFICIENT PRACH DETECTION

This application is a 35 U.S.C. § 371 national phase filing of International Application No. PCT/EP2018/062636, filed May 16, 2018, the disclosure of which is incorporated herein by reference in its entirety.

TECHNICAL FIELD

The present disclosure relates to random access in a cellular communications network and, in particular, relates to detection of a random access preamble at a base station.

BACKGROUND

Random access is a procedure by which a wireless device requests connection setup in a cellular communications system. Random access is used in many situations such as, e.g., when establishing a radio link during initial access, when reestablishing a radio link after radio link failure, when establishing a radio link to a new cell after a handover, when sending a scheduling request if no dedicated scheduling request resources have been configured for the wireless device on the uplink control channel, etc. In Third Generation Partnership Project (3GPP) Long Term Evolution (LTE) and New Radio (NR) (which is also referred to as Fifth Generation (5G)), during the random access procedure, a User Equipment device (UE) transmits a random access preamble on a shared Physical Random Access Channel (PRACH). Typically, the random access preamble (also referred to herein as the PRACH preamble) includes a random access sequence (also referred to herein as a PRACH sequence) and a Cyclic Prefix (CP). At the base station, which is referred to as an evolved or enhanced Node B (eNB) in 3GPP LTE and a NR base station (gNB) in 3GPP NR, the base station includes a PRACH detector that operates to detect the PRACH preamble transmitted by the UE.

The PRACH detector at the base station detects a PRACH preamble, and more specifically a PRACH sequence, transmitted from the UE on the PRACH. Specifically, the PRACH detector identifies the PRACH sequence transmitted by the UE on the PRACH as well as a time offset of the PRACH sequence. This PRACH detection should be performed with in such a manner that there is a high probability for detecting the PRACH sequence and a low probability of false detection. Upon detecting the PRACH sequence transmitted by the UE, the base station responds to the UE with a Random Access Response (RAR) message including timing information.

FIG. 1 illustrates options that have been proposed for the PRACH preamble in 3GPP NR. Option 1 is based on repeating the same PRACH sequence (i.e., the same PRACH Orthogonal Frequency Division Multiplexing (OFDM) symbol) without CP between the repetitions such that one PRACH OFDM symbol acts as a CP for the next PRACH OFDM symbol. Option 2 repeats the same PRACH sequence, while Option 4 uses different PRACH sequences for the repetitions. The present disclosure relates to Option 1 where the PRACH preamble is a sequence of multiple repetitions of the PRACH OFDM symbol in a back-to-back manner (i.e., without any CP).

FIG. 2 shows the steps performed by a PRACH detector for 3GPP NR when using Option 1 for the PRACH preamble design and using conventional PRACH detection techniques. The PRACH preamble includes multiple repetitions of the same PRACH OFDM symbol (i.e., multiple repetitions of the same PRACH sequence). These PRACH OFDM symbols span a number of subcarriers. For NR, the number of subcarriers used for the PRACH OFDM symbols is 72 in the normal case. Normally, the PRACH preamble is transmitted in one slot (i.e., the duration of the PRACH preamble including the multiple repetitions of the same PRACH OFDM symbol is one slot). Each of the time-domain PRACH OFDM symbols received at the base station is transformed from the time domain to the frequency domain by a short Fast Fourier Transform (FFT) over the PRACH OFDM symbol length.

For each PRACH OFDM symbol, matched filtering of the frequency-domain representation of that PRACH OFDM symbol output by the FFT is performed per subcarrier. The matched filtering applies a frequency-domain representation of the PRACH sequence to the output of the FFT on a per subcarrier basis. The delay of the received PRACH OFDM symbol shows up as a phase ramp over subcarriers.

The outputs of the matched filters are coherently accumulated over subcarriers and PRACH OFDM symbols to provide an accumulated output. The accumulated output is transformed from the frequency domain to the time domain. That is, an Inverse FFT (IFFT) is performed of the accumulated output. The output of the IFFT is a Dirac pulse at a position that corresponds to the actual delay. The output of the IFFT is recalculated to power. While not illustrated, non-coherent combining may be performed over different antenna polarizations and/or symbol blocks (i.e., the blocks of symbols combined in the coherent combining), and an estimate of the Signal to Noise Ratio (SNR) for all codes, all time positions, and all beam directions is made. A decision as to whether a PRACH preamble has been detected is then made.

SUMMARY

Systems and methods are disclosed herein for detecting a Physical Random Access Channel (PRACH) transmission from a User Equipment device (UE) in a cellular communication network. In some embodiments, a base station comprises a radio device and at least one additional device. The radio device comprises a plurality of narrowband receivers respectively coupled to a plurality of antenna elements of an antenna array of the base station. Each narrowband receiver is configured to receive a receive signal from a respective one of the plurality of antenna elements and process the receive signal to provide a plurality of received symbols for a PRACH received via the respective one of the plurality of antenna elements. A bandwidth of each narrowband receiver corresponds to a bandwidth of the PRACH. The radio device also comprises accumulation circuitry configured to, for each of the plurality of antenna elements, accumulate a subset of the plurality of received symbols for the PRACH received via the antenna element to output a first averaged symbol for the PRACH received via the antenna element. The at least one additional device is configured to receive, from the radio device, the first averaged symbols for the PRACH received via the plurality of antenna elements and process the first averaged symbols for the PRACH to perform PRACH detection for one or more receive beams. As a result of the narrowband receivers and the accumulation circuitry, the amount of data that needs to be communicated from the radio device to the at least one additional device is substantially reduced.

In some embodiments, the subset of the plurality of received symbols for the PRACH is a first N received symbols of the plurality of received symbols for the PRACH, wherein N is positive integer number that is greater than 1 and less than or equal to a total number of received symbols in the plurality of received symbols for the PRACH.

In some embodiments, the accumulation circuitry is further configured to, for each of the plurality of antenna elements, accumulate a second subset of the plurality of received symbols for the PRACH received via the antenna element to output a second averaged symbol for the PRACH received via the antenna element. In some embodiments, the subset of the plurality of received symbols for the PRACH is the first N received symbols of the plurality of received symbols for the PRACH, and the second subset of the plurality of received symbols for the PRACH is the next N received symbols of the plurality of received symbols for the PRACH, wherein N is a positive integer number that is greater than 1 and less than or equal to ½ of a total number of received symbols in the plurality of received symbols for the PRACH.

In some embodiments, N is configurable. In some embodiments, N is a variable value that is a function of one or more system parameters. In some embodiments, the one or more system parameters comprise an in-band interference level.

In some embodiments, the radio device is communicatively coupled to the at least one additional device via a communication interface.

In some embodiments, the at least one additional device comprises a second device that is communicatively coupled to the radio device via a communication interface, wherein the second device is configured to receive the first averaged symbols from the radio device via the communication interface. In some embodiments, the communication interface is a Common Public Radio Interface (CPRI). In some embodiments, the second device is further configured to transform the first averaged symbols for the PRACH received via the plurality of antenna elements from the time domain to the frequency domain and the beam domain to thereby provide a per subcarrier output for each of the one or more receive beams, wherein the at least one additional device is further configured to process the per subcarrier output for each of the one or more receive beams to perform PRACH detection for the one or more receive beams. Note that the frequency domain results from the conversion of the time domain signals received from the antenna elements to the frequency domain. The resulting frequency domain signals are then processed to form frequency-domain representations of the signals in various beam directions. This is now the beam domain. In some embodiments, the at least one additional device comprises a third device configured to receive the per subcarrier output for each of the one or more receive beams, and process the per subcarrier output for each of the one or more receive beams to perform PRACH detection for the one or more receive beams. In some embodiments, the first device is a first Application Specific Integrated Circuit (ASIC) or a first Field Programmable Gate Array (FPGA), the second device is a second ASIC or a second FPGA, and the third device is a third ASIC or a third FPGA. In other words, each of the first, second, and third devices can be implemented as an ASIC or a FPGA.

In some embodiments, the first device is a first ASIC or FPGA and the second device is a second ASIC or a second FPGA.

In some embodiments, the at least one additional device comprises time domain to frequency domain transformation circuitry, beam transformation circuitry, matched filtering circuitry, and frequency domain to time domain transformation circuitry. The time domain to frequency domain transformation circuitry is configured to, for each first averaged symbol of the first averaged symbols for the PRACH received via the plurality of antenna elements, transform the first averaged symbol from the time domain to the frequency domain to thereby provide a plurality of frequency-domain outputs, one for each subcarrier in the PRACH received via the respective antenna element of the plurality of antenna elements. The beam transformation circuitry is configured to transform the pluralities of frequency-domain outputs for the PRACH received via the plurality of antenna elements, respectively, from an antenna domain to a beam domain to thereby provide, for each subcarrier in the PRACH, a plurality of beam-domain outputs, one for each of a plurality of receive beam directions. The matched filtering circuitry is configured to, for each beam-domain output of the plurality of beam-domain outputs for each of the plurality of receive beam directions, perform matched filtering of the beam-domain output based on a frequency-domain representation of a random access symbol sequence for which detection is to be performed to thereby provide a matched filter output for each of the subcarriers in the PRACH for each of the plurality of receive beam directions.

The frequency domain to time domain transformation circuitry is configured to, for each receive beam direction of the plurality of receive beam directions, transform the matched filter outputs for the received beam direction from the frequency domain to the time domain to provide a time-domain output for each receive beam direction. The at least one additional device further comprises circuitry configured to, for each receive beam direction, generate a magnitude squared of the time-domain output for the receive beam direction, thereby providing a first magnitude squared value for each of the plurality of receive beam directions. In the same manner, the time domain to frequency domain transformation circuitry, the beam transformation circuitry, the matched filtering circuitry, the frequency domain to time domain transformation circuitry, and the circuitry are further configured to process the second averaged symbols for the PRACH received via the plurality of antenna elements to thereby provide a second magnitude squared value for each of the plurality of receive beam directions. The one or more additional devices further comprise non-coherent combining circuitry configured to, for each receive beam direction of the plurality of receive beam directions, non-coherently combine the first and second magnitude squared values for the receive beam direction to thereby provide a combined time-domain output for the receive beam direction, and detection circuitry configured to perform PRACH on the receive beams based on the combined time-domain outputs for the one or more receive beams, respectively.

Embodiments of a method of operation of a base station for detecting a PRACH transmission from a UE in a cellular communications network are also disclosed. In some embodiments, the method comprises, at a radio device, for each antenna element of a plurality of antenna elements of an antenna array of the base station: receiving, at a narrowband receiver, a receive signal from a respective one of the plurality of antenna elements; processing the receive signal at the narrowband receiver to provide a plurality of received symbols for a PRACH received via a respective one of the plurality of antenna elements, wherein a bandwidth of the narrowband receiver corresponds to a bandwidth of the PRACH; and accumulating a subset of the plurality of received symbols for the PRACH received via the antenna element to output a first averaged symbol for the PRACH received via the antenna element. The method further comprises, at one or more additional devices: receiving, from the radio device, the first averaged symbols for the PRACH received via the plurality of antenna elements; and processing the first averaged symbols for the PRACH to perform PRACH detection for a one or more receive beams.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 4 illustrates a back-to-back Fast Fourier Transform (FFT) of a sequence of PRACH symbols;

DETAILED DESCRIPTION

Figure 1:
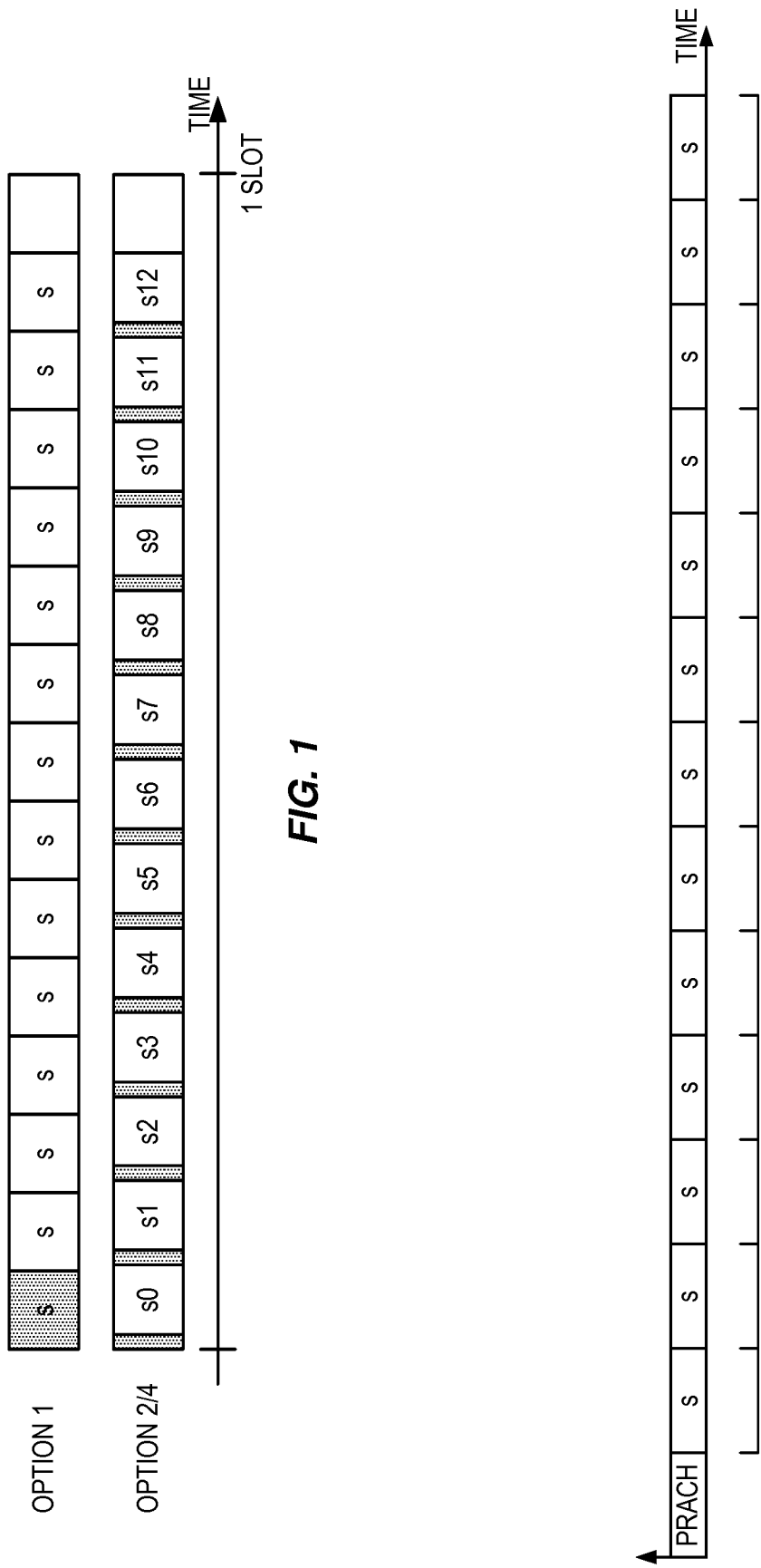
FIG. 1 illustrates options that have been proposed for the Physical Random Access Channel (PRACH) preamble in Third Generation Partnership Project (3GPP) New Radio (NR)

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell;" however, particularly with respect to 5G NR concepts, beams may be used instead of cells and, as such, it is important to note that the concepts described herein are equally applicable to both cells and beams.

Typically, a base station includes a radio unit and a digital unit. With regard to Physical Random Access Channel (PRACH) detection, the PRACH detector is a functionality that is conventionally part of a digital unit. The radio unit forwards received signals to the PRACH detector. No pre-processing is performed in the radio unit.

Issues arise when using the conventional PRACH detector in systems, such as 3GPP NR, that operate at high carrier frequencies such as, for example, 28 Gigahertz (GHz). At these frequencies, the base station needs to use an antenna array consisting of a large number of antennas, and beamforming needs to be used to enable communication with good quality, in a sufficiently large geographical coverage region.

Due to the poor link budget at high carrier frequencies, the received information from all antenna elements has to be combined at the base station. This can be done when the spatial direction to the UE from which the information is received and the radio path to the UE is known to the base station receiver. When this knowledge is established, the base station receiver can combine signals from all antennas to establish a good coherent combining of signal from all receive paths. A simplistic view is to state that a narrow antenna beam is focused in the direction of the signal energy arriving at the base station antenna array from the UE.

For optimal receiver performance, the radio unit of the base station will transfer all radio receive paths separately to the digital domain and then transform each path to the frequency domain to enable signal combination in the frequency domain. This enables frequency dependent combination of received signals. Typically, this requires information from each receive path to be transferred between at least the radio unit, which is typically implemented as an Application Specific Integrated Circuit (ASIC) or Field Programmable Gate Array (FPGA), to the digital, or baseband, unit, which is typically implemented as one or more additional ASICs or FPGAs, performing time to frequency domain transformations as well as antenna combining.

The number of antenna elements and thus receive paths at the base station can be large (e.g., greater than 100); hence, the amount of information to be transferred over a communication interface between the radio unit and the digital unit is large. A consequence may be high cost both in terms of ASIC implementation as well as in power consumption. To mitigate this problem, many solutions perform all or part of the signal combination in the time domain, thereby reducing the interface load.

In contrast to normal uplink transmissions, for the PRACH reception, there is no, or at less insufficient, knowledge of the spatial direction in which the received power from the UE arrives at the antenna array of the base station. In other words, there is no information on where to listen for a potential PRACH preamble transmission. Hence all received signal paths need to be transformed into beam-domain information, where each beam represents received signal energy (information) from one direction. The PRACH detector thus has to search for a signal in all beam directions when searching for a PRACH preamble transmission. When a PRACH preamble is detected, the UE identity is known from the PRACH sequence, timing offset, and beam direction.

The search for a PRACH preamble transmission over different beam directions can be performed sequentially by controlling the radio unit to listen to different beam directions. However, this solution is not desirable since it is very time consuming and requires the UE to repeat its PRACH preamble many times. A better solution is to use an optimal receiver architecture for PRACH preamble detection. This requires received PRACH signals from each antenna element to be sent over the communication interface from the radio ASIC(s) or FPGA(s) to the baseband ASIC(s) or FPGA(s). The signal bandwidth for the PRACH signals is however much smaller than the full bandwidth of the NR air-interface; hence, it can be realistic to implement a special narrowband receiver with optimal receiver performance dedicated for the PRACH signal. The interface cost may, however, still be too high.

The present disclosure describes systems and methods for cost-efficient PRACH detection, e.g., in a 3GPP NR system. In particular, systems and methods are disclosed for providing PRACH detection at a base station, while reducing the amount of information that needs to be communicated over a communication interface between a radio device (e.g., a radio ASIC(s) or a radio FPGA(s)) of the base station and one or more additional devices (e.g., one or more additional ASIC(s) or FPGA(s)) of the base station that process received signals to perform PRACH detection. Note that while the systems and methods are disclosed herein relate to PRACH detection, the accumulation principle used to combine symbol information in the radio device (e.g., in a radio ASIC or a radio FPGA) can be used for reception of uplink sounding information.

More specifically, the present disclosure provides embodiments of a base station and method of operation thereof in which coherent accumulation of PRACH Orthogonal Frequency Division Multiplexing (OFDM) symbols is performed in the radio device of the base station. As discussed above with respect to FIG. 2, when using a conventional PRACH detector, coherent accumulation is performed in the digital unit of the base station after matched filtering per symbol. Further, due to the need to transfer of PRACH signals from all antenna elements from the radio unit to the digital unit to enable searching for PRACH preamble transmissions in the beam domain, a very large amount of information must be transferred from the radio unit to the digital unit.

Embodiments of the present disclosure address the aforementioned problem by performing coherent accumulation of the PRACH OFDM symbols in the time domain at the radio unit (e.g., within a radio device such as, e.g., a radio ASIC or FPGA, of the base station). With no loss of performance, a relevant number of the PRACH OFDM symbols are aggregated in the time domain at the radio unit prior to sending the result over the communication interface towards the digital unit (e.g., one or more additional devices such as one or more additional ASICs or FPGAs, of the base station). This drastically reduces the capacity requirements of the communication interface needed for PRACH information transfer as well as reduces the processing load in subsequent PRACH detector stages. For example, if the PRACH preamble includes ten repetitions, then accumulation of PRACH symbols in the time domain at the radio unit can decrease the amount of information transferred from the radio unit to the digital unit by a factor up to 10. Also, the amount of calculations needed to arrive at a PRACH preamble detection in the remaining PRACH detection stages is reduced by a factor up to 10.

In addition, the proposed solution enables a separation of antenna near radio ASIC or FPGA functionality from baseband processing performed in baseband ASICs or FPGAs and software. In some situations the interface capacity reduction may enable a further split of the base station in one baseband part that is executing on other hardware, like on i86 based cloud servers, and an antenna near radio heads. In such situation the information carried over the interfaces becomes coherently averaged PRACH symbol related information, requiring less bandwidth than would be the case without the present disclosure. Thus, embodiments of the present disclosure enable a separation of antennas near radio ASIC or FPGA functionality from baseband processing performed in baseband ASICs or FPGAs and software by reducing the interface capacity requirements to a level that is small enough to allow such a split.

Figure 3:
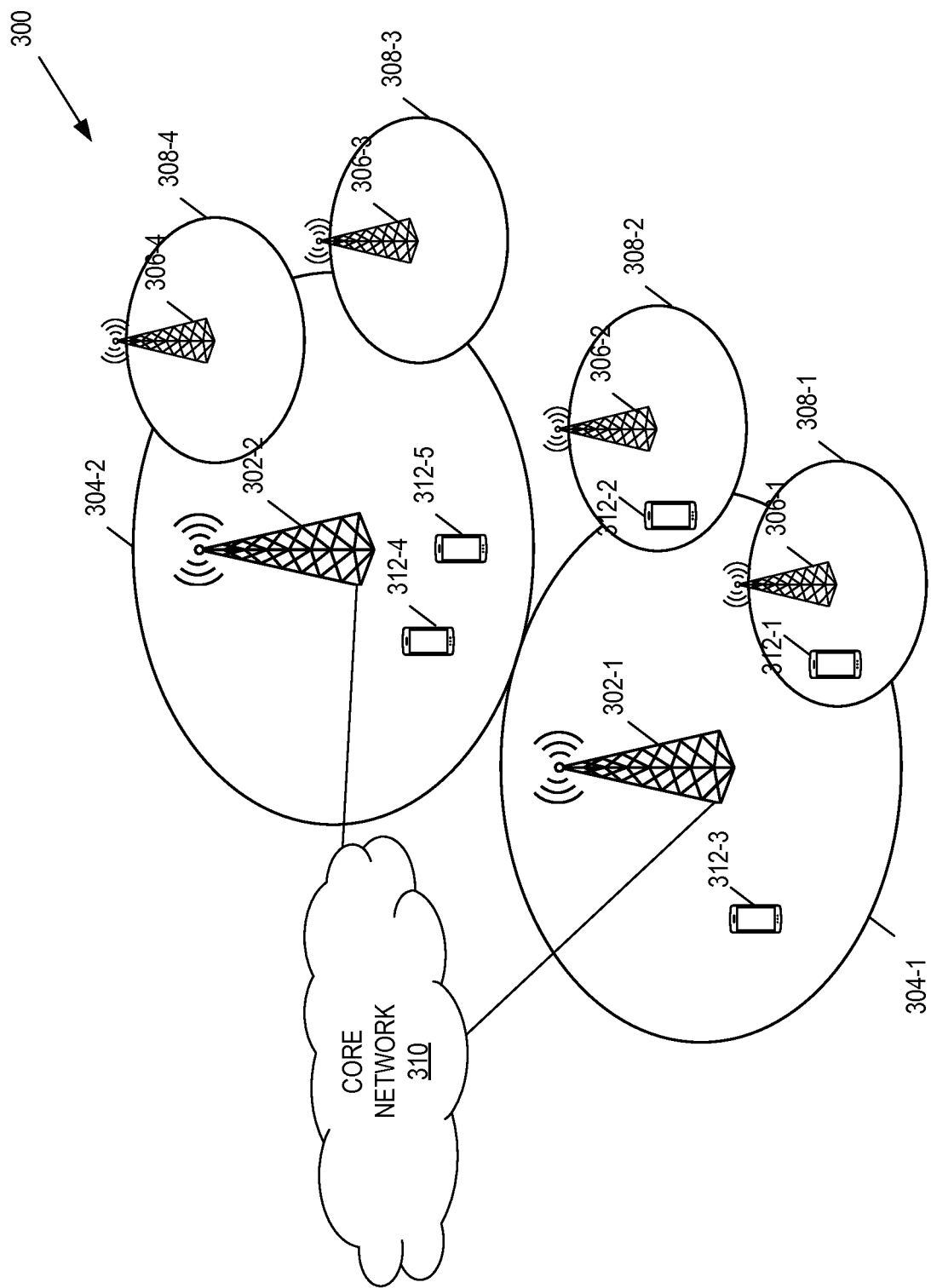
FIG. 3 illustrates one example of a cellular communications network according to some embodiments of the present disclosure.

FIG. 3 illustrates one example of a cellular communications network 300 in which embodiments of the present disclosure may be implemented. In the embodiments described herein, the cellular communications network 300 is a 5G NR network. In this example, the cellular communications network 300 includes base stations 302-1 and 302-2, which in 5G NR are referred to as gNBs, controlling corresponding macro cells 304-1 and 304-2. The base stations 302-1 and 302-2 are generally referred to herein collectively as base stations 302 and individually as base station 302. Likewise, the macro cells 304-1 and 304-2 are generally referred to herein collectively as macro cells 304 and individually as macro cell 304. The cellular communications network 300 may also include a number of low power nodes 306-1 through 306-4 controlling corresponding small cells 308-1 through 308-4. The low power nodes 306-1 through 306-4 can be small base stations (such as pico or femto base stations) or Remote Radio Heads (RRHs), or the like. Notably, while not illustrated, one or more of the small cells 308-1 through 308-4 may alternatively be provided by the base stations 302. The low power nodes 306-1 through 306-4 are generally referred to herein collectively as low power nodes 306 and individually as low power node 306. Likewise, the small cells 308-1 through 308-4 are generally referred to herein collectively as small cells 308 and individually as small cell 308. The base stations 302 (and optionally the low power nodes 306) are connected to a core network 310.

The base stations 302 and the low power nodes 306 provide service to wireless devices 312-1 through 312-5 in the corresponding cells 304 and 308. The wireless devices 312-1 through 312-5 are generally referred to herein collectively as wireless devices 312 and individually as wireless device 312. The wireless devices 312 are also sometimes referred to herein as UEs.

Note that the PRACH OFDM symbols are transmitted by a wireless device (e.g., a UE) over a shared channel, namely, the PRACH. To reduce the probability for errors, the PRACH OFDM symbols are sent with orthogonal codes to separate wireless devices from each other. For each PRACH OFDM symbol time, a number of subcarriers are used to carry PRACH sequence. For NR, the PRACH sequences (which are also referred to as PRACH codes) are shorter than in the Fourth Generation (4G) LTE system. Therefore, the number of subcarriers used by the PRACH OFDM symbols in NR is low and, as such, the occupied bandwidth is low for transmitting the PRACH preamble alone. As such, narrowband receivers can be used for reception of PRACH OFDM symbols. Further, by using the narrowband receivers, the amount of information needed to send all received information from all receiver antenna elements from a radio unit of the base station (e.g., the base station 302) to a digital unit of the base station for PRACH detection is dramatically reduced. However, despite this reduction, there are still problems with the amount of information.

Figure 2:
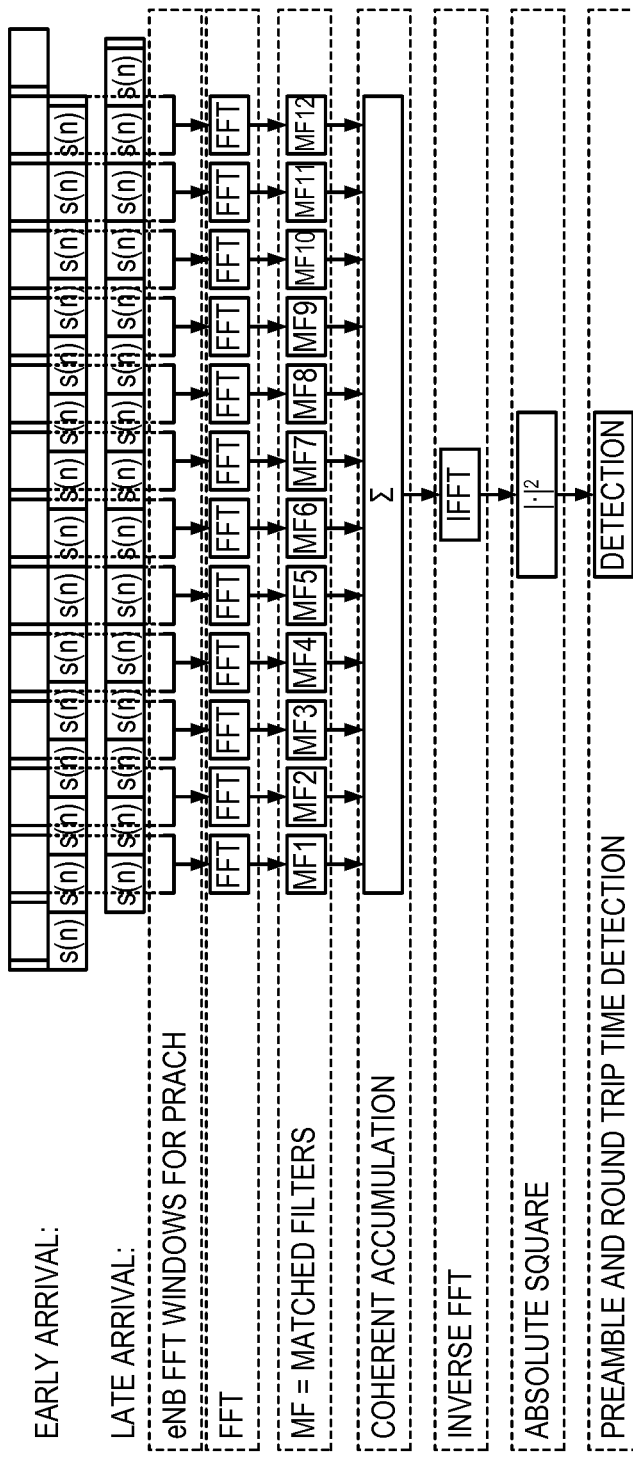
FIG. 2 shows steps performed by a PRACH detector for 3GPP NR when using a particular option for the PRACH preamble design and using conventional PRACH detection techniques.

It is worth noting that the Fast Fourier Transform (FFT) operation shown in FIG. 2, showing an existing PRACH receiver, is the same FFT operation used for transforming all information covering the full information bandwidth. When using narrowband receivers for PRACH, this is not the case since the FFT input information is only covering the PRACH bandwidth. The other information has been filtered away by the narrowband receivers. As a result, the sampling rate can be reduced accordingly. Hence, a back-to-back FFT not having the normal Cyclic Prefix (CP) gap between each FFT window can be used for PRACH processing. FIG. 4 illustrates such a back-to-back FFT.

As can be seen this enables a solution where a different PRACH detector with repartitioned functionality results. A new component is added to the radio unit (e.g., a new component is added to the radio ASIC or FPGA) enabling all coherent accumulation to be done at very early stages within the radio unit (e.g., within the radio ASIC or FPGA). This accumulation is done before the FFT. This accumulation is possible because the time domain intervals to be accumulated are placed back-to-back as illustrated in FIG. 4.

Figure 5:
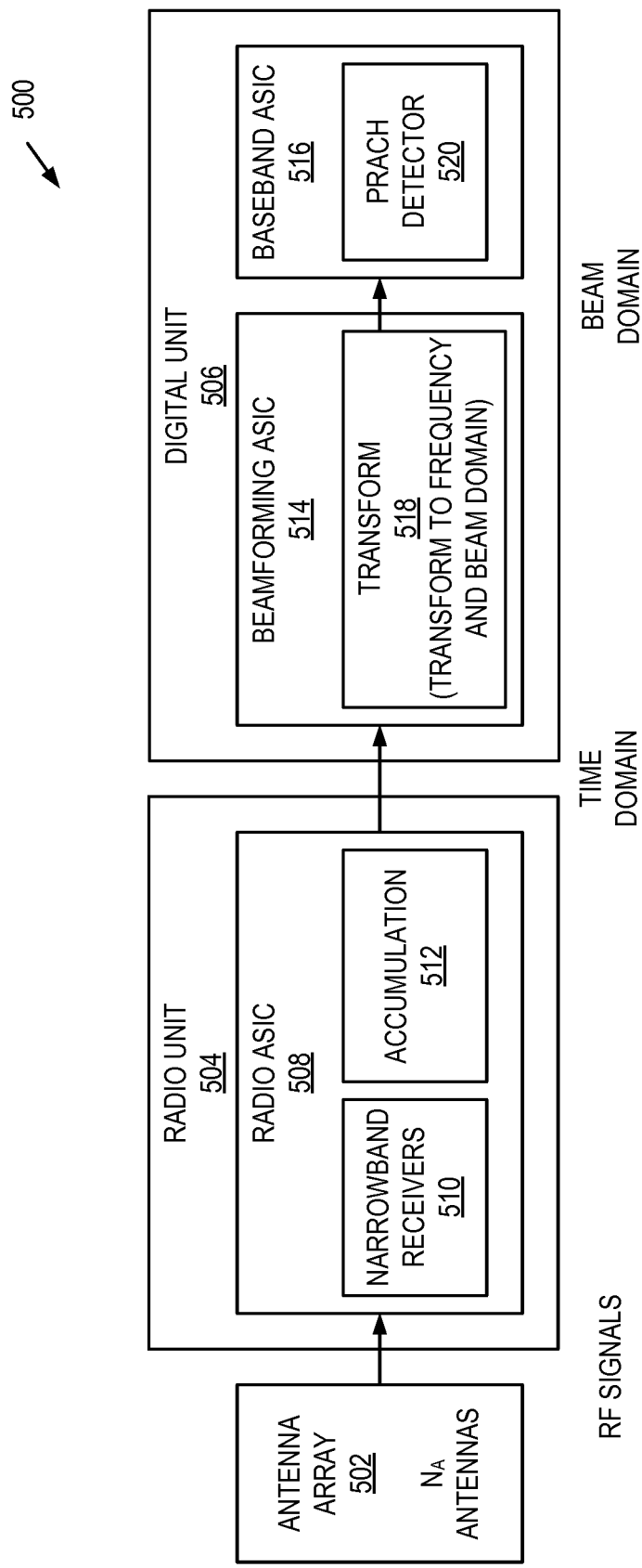
FIG. 5 is a more detailed illustration of a base station in accordance with some embodiments of the present disclosure.

In this regard, FIG. 5 is a more detailed illustration of a base station 500, such as, e.g., the base station 302 of FIG. 3, in accordance with some embodiments of the present disclosure. As illustrated, the base station includes an antenna array 502, a radio unit 504, and a digital unit 506. The antenna array 502 includes a number ($N_A$) of antennas, which are also referred to herein as antenna elements. Note that an antenna element may be a sub-array consisting of multiple patch elements with a common feed point or a single element. The radio unit 504 includes a radio device, which in this example is a radio ASIC 508. The radio ASIC 508 includes a number ($N_A$) of narrowband receivers 510 coupled to respective antenna elements of the antenna array 502. The narrowband receivers 510 operate to receive signals from the respective antenna elements and process those signals to output PRACH OFDM symbols in the time domain. For each antenna element (i.e., for each antenna branch, which is also referred to as a receive branch), accumulation circuitry 512 accumulates N of the PRACH OFDM symbols received via the antenna element to provide an averaged PRACH symbol (also referred to herein as an accumulated output). In some embodiments, the number (N) of PRACH OFDM symbols that are accumulated is a positive integer that is greater than 1 and less than or equal to a total number of PRACH OFDM symbols in a PRACH preamble (i.e., less than or equal to the number of repetitions of the same PRACH OFDM symbol in a PRACH preamble). In one example embodiment, the number (N) of PRACH OFDM symbols that are accumulated is equal to the number of PRACH OFDM symbols in the PRACH preamble. In another example embodiment, the number (N) of PRACH OFDM symbols that are accumulated is equal to ½ or some other fraction of the number of PRACH OFDM symbols in the PRACH preamble. As an example in which this fraction is ½, in an implementation in which the total number of PRACH OFDM symbols in a PRACH preamble is 12, the number (N) of PRACH OFDM symbols that are accumulated is 6 such that, for a particular PRACH preamble, the accumulation circuitry 512 outputs a first averaged PRACH symbol for the first 6 PRACH OFDM symbols and a second averaged PRACH symbol for the next 6 PRACH OFDM symbols.

Note that multiple accumulations (e.g., accumulating a first time for the first N PRACH OFDM symbols and a second time for the next N PRACH OFDM symbols) increases the robustness to frequency errors, phase noise, and time varying channels.

Also, in some embodiments, the number (N) of PRACH OFDM symbols that are accumulated is adapted according to one or more system parameters such as, e.g., load of interfaces (i.e., the amount of interference) or according to one or more known channel characteristics such as, e.g., frequency errors, phase noise, and time varying channel conditions.

The radio ASIC 508 sends the averaged PRACH symbols for each of the antenna branches to the digital unit 506, and in particular to a beamforming ASIC 514 of the digital unit 506, via a communication interface. As an example, the communication interface may be a Common Public Radio Interface (CPRI) interface. By accumulating the PRACH OFDM symbols in the time domain at the radio ASIC 508, the amount of information that needs to be communicated from the radio ASIC 508 to the digital unit 506 over the communication interface is substantially reduced as compared to an implementation of a base station in which the accumulation occurs in the digital unit 506, as would be the case when using conventional PRACH detection architectures.

Note that, while not illustrated, the radio ASIC 508 may include additional components as will be appreciated by one of ordinary skill in the art. For example, the radio ASIC 508 may include wideband receivers for receiving signals other than PRACH signals.

The digital unit 506 includes a number of additional devices, which in this example are the beamforming ASIC 514 and a baseband ASIC 516. The beamforming ASIC 514 receives the averaged PRACH symbols from the radio ASIC 508 for each of the antenna branches. Within the beamforming ASIC 514, transformation circuitry 518 first transforms the averaged PRACH symbols from the time domain to the frequency domain, thereby resulting in frequency-domain representations of the averaged PRACH symbols. The transformation circuitry 518 then transforms these frequency-domain representations of the averaged PRACH symbols (from the antenna domain) to the beam domain to thereby provide a beam-domain output for each subcarrier of the PRACH in the frequency domain for each of two or more receive beams (i.e., for each of two or more receive beam directions). In this manner, a frequency-domain representation of an averaged PRACH symbol is provided for each of the receive beams.

Figure 6:
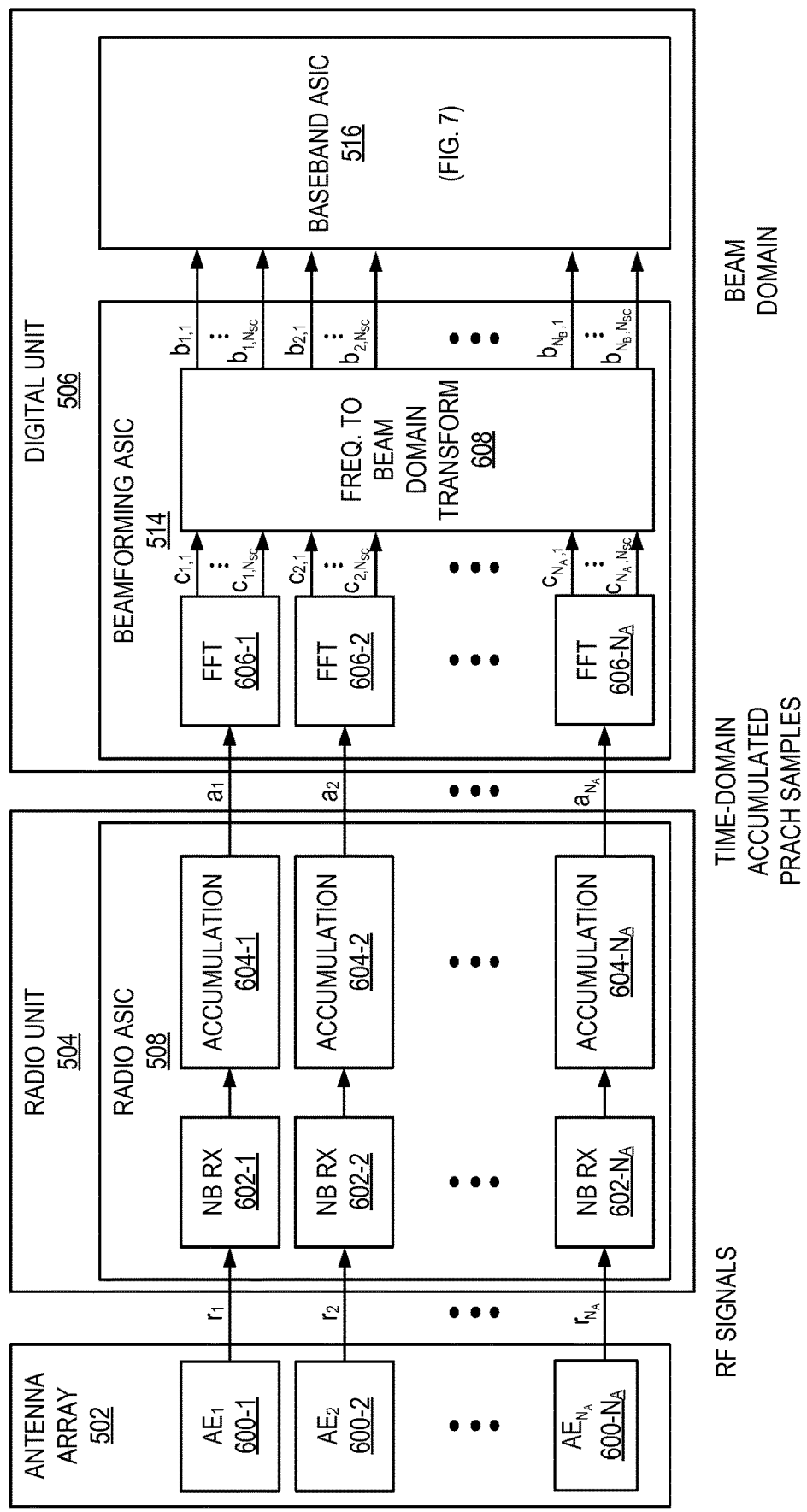
FIGS. 6 and 7 illustrate the base station of FIG. 5 in more detail according to one example embodiment.
Figure 7:
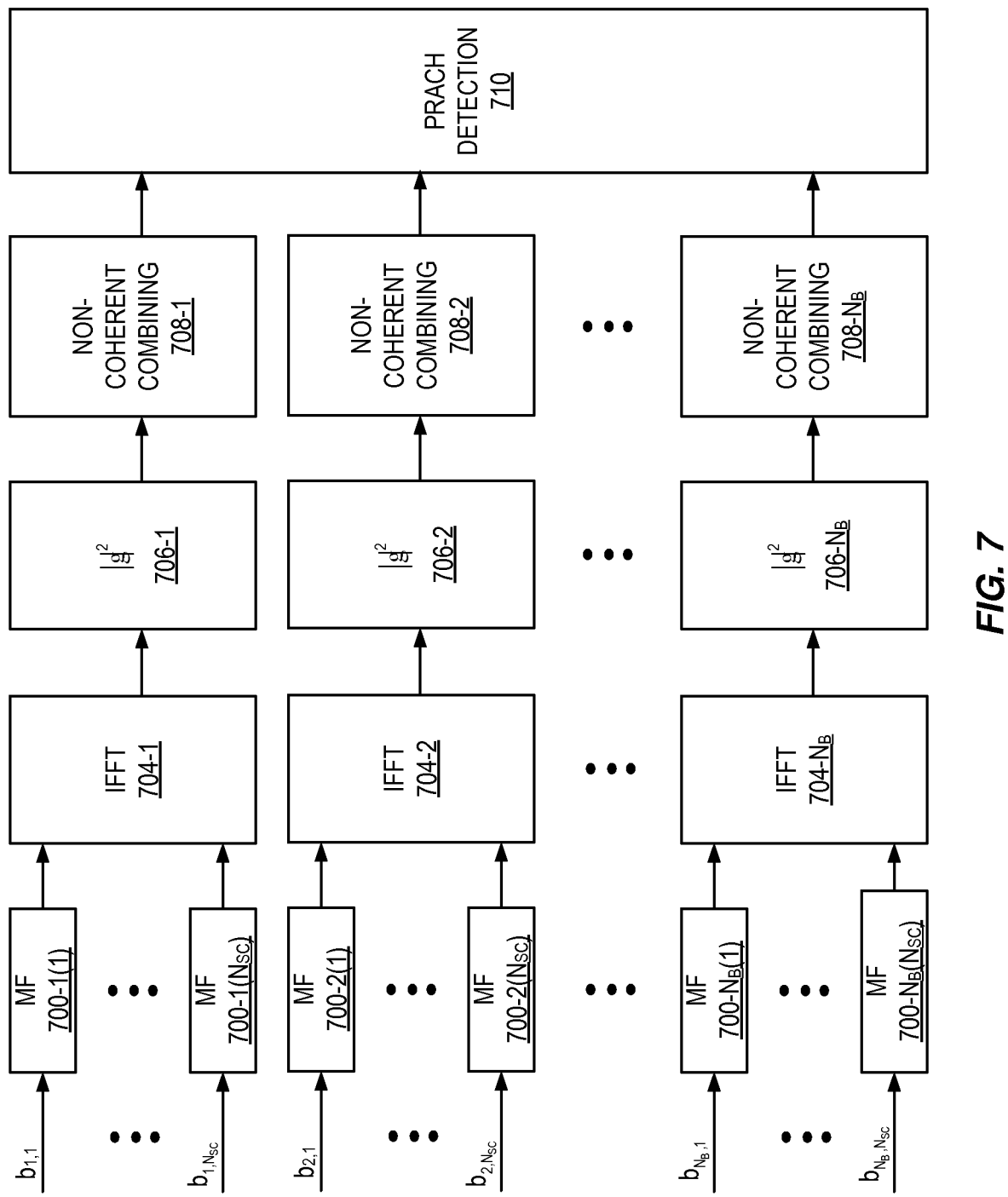

The baseband ASIC 516 receives the outputs of the beamforming ASIC 514 for each of the receive beams. At the baseband ASIC 516, a PRACH detector 520 processes the outputs of the beamforming ASIC 514 to perform PRACH detection for each of the receive beams. While not illustrated, if a PRACH preamble from a particular UE is detected, the respective beam direction and time offset are thereby known and the base station transmits a Random Access Response (RAR) to that UE (e.g., using the detected beam direction) and the random access procedure continues to thereby establish a radio link between the base station and the UE, as will be appreciated by one of skill in the art. FIGS. 6 and 7 illustrate the base station of FIG. 5 in more detail according to one example embodiment. As illustrated, the antenna array 502 includes a number ($N_A$) of antenna elements 600-1 through 600-$N_A$, which are labelled as $AE_1$ through $AE_{N_A}$. Within the radio ASIC 508, the narrowband receivers 510 include narrowband receivers 602-1 through 602-$N_A$ coupled to the antenna elements 600-1 through 600-$N_A$, respectively, and the accumulation circuitry 512 includes accumulation circuits 604-1 through 604-$N_A$. In operation, the narrowband receivers 602-1 through 602-$N_A$ receive signals $r_1$ through $r_{N_A}$ from the antenna elements 600-1 through 600-$N_A$, respectively, and process the signals $r_1$ through $r_{N_A}$ to output PRACH OFDM symbols in the time domain for each of the antenna elements 600-1 through 600-$N_A$. The accumulation circuit 604-1 accumulates a number (N) of the PRACH OFDM symbols received via the antenna element 600-1 to output an averaged PRACH symbol for the antenna element 600-1. Likewise, the accumulation circuit 604-2 accumulates a number (N) of the PRACH OFDM symbols received via the antenna element 600-2 to output an averaged PRACH symbol for the antenna element 600-2, etc. The averaged PRACH symbols are denoted in FIG. 6 as $a_1$ through $a_{N_A}$. The radio ASIC 508 communicates the averaged PRACH symbols $a_1$ through $a_{N_A}$ to the beamforming ASIC 514 via a communication interface, as discussed above.

In some embodiments, the number (N) of PRACH symbols accumulated by the accumulation circuitry 604-1 through 604-$N_A$ is a fraction of the total number of PRACH OFDM symbols. In this case, the radio ASIC 508 communicated the averaged PRACH symbols $a_1$ through $a_{N_A}$ to the beamforming ASIC 514 resulting from the first accumulation period (i.e., the period of time corresponding to the first N PRACH OFDM symbols), then separately communicates averaged PRACH symbols $a_1$ through $a_{N_A}$ to the beamforming ASIC 514 resulting from the second accumulation period (i.e., the period of time corresponding to the second N PRACH OFDM symbols), etc. Thus, the radio ASIC 508 outputs a set of averaged PRACH symbols $a_1$ through $a_{N_A}$ for each accumulation period. Each of these sets of averaged PRACH symbols is then processed by the beamforming ASIC 514 and the baseband ASIC 516, as described below.

At the beamforming ASIC 514, the transformation circuitry 518 includes FFTs 606-1 through 606-$N_A$ and frequency-to-beam domain transformation circuitry 608. For each set of averaged PRACH symbols, the FFTs 606-1 through 606-$N_A$ and the frequency-to-beam domain transformation circuitry 608 operate as follows. The FFT 606-1 operates to transform the averaged PRACH symbol $a_1$ from the time domain to the frequency domain to thereby provide a frequency-domain representation of the averaged PRACH symbol $a_1$. This frequency-domain representation comprises an output for each subcarrier of the PRACH. These outputs are denoted in FIG. 6 as $c_{1,1}$ to $c_{1,N_{SC}}$, where, for $c_{x,y}$, x is an index of the corresponding antenna element and y is an index of the corresponding subcarrier, and $N_{SC}$ is the total number of subcarriers in the PRACH. Likewise, the FFT 606-2 operates to transform the averaged PRACH symbol $a_2$ from the time domain to the frequency domain to thereby provide a frequency-domain representation of the averaged PRACH symbol $a_2$, etc.

The frequency-to-beam domain transformation circuitry 608 transforms the outputs of all of the FFTs 606-1 through 606-$N_A$ from the antenna domain to the beam domain to thereby provide beam-domain outputs for each subcarrier for each receive beam to be search for a PRACH preamble. In FIG. 6, the beam-domain outputs are denoted as $b_{x,y}$, where here x is an index of the corresponding subcarrier and y is an index of the corresponding receive beam, $N_{SC}$ is the total number of subcarriers in the PRACH, and $N_B$ is the total number of receive beams. Thus, as an example, the beam-domain outputs $b_{i,1}$ to $b_{i,N_{SC}}$ are a frequency-domain representation of an averaged PRACH symbol received on the i-th receive beam.

For each set of averaged PRACH symbols received by the beamforming ASIC 514, the respective beam-domain outputs generated by the beamforming ASIC 514 are communicated to the baseband ASIC 516. The details of one example embodiment of the baseband ASIC 516 is illustrated in FIG. 7. As illustrated in FIG. 7, the baseband ASIC 516 includes, for each i-th receive beam (for i=1, ..., $N_B$), matched filters 700-$i$(1) through 700-$i$($N_{SC}$) that perform matched filtering of the beam-domain outputs $b_{i,1}$ to $b_{i,N_{SC}}$ for the i-th receive beam based on a frequency-domain representation of the PRACH sequence for which detection is being performed. This matched filtering may be repeated for each of a number of possible PRACH sequences.

For each i-th receive beam (for i=1, ..., $N_B$), the outputs of the matched filters 700-$i$(1) through 700-$i$($N_{SC}$) for the i-th receive beam are transformed from the frequency domain to the time domain by a respective Inverse FFT (IFFT) 704-$i$. The time-domain output of the IFFT 604-$i$ is recalculated to power by a corresponding magnitude squared calculation circuit 706-$i$. The magnitude squared value for the i-th receive beam is passed to a non-coherent combining circuit 708-$i$ for the i-th beam. The non-coherent combining circuit 708-$i$ is optional and operates to non-coherently combine the magnitude squared value for the output of the IFFT 704-$i$ resulting from the averaged PRACH symbol with magnitude squared value(s) for the output of the IFFT 704-$i$ resulting from an additional averaged PRACH symbol. This is the case if the number (N) of PRACH symbols accumulated is a fraction of the total number of PRACH symbols for the PRACH preamble.

The outputs of the non-coherent combining circuitries 708-1 through 708-$N_B$ are provided to PRACH detection circuitry 710. For each i-th receive beam, the PRACH detection circuitry 710 makes a decision as to whether a PRACH preamble is detected for that receive beam based on the output of the respective non-coherent combining circuitry 708-$i$, as will be appreciated by one of ordinary skill in the art.

Figure 8:
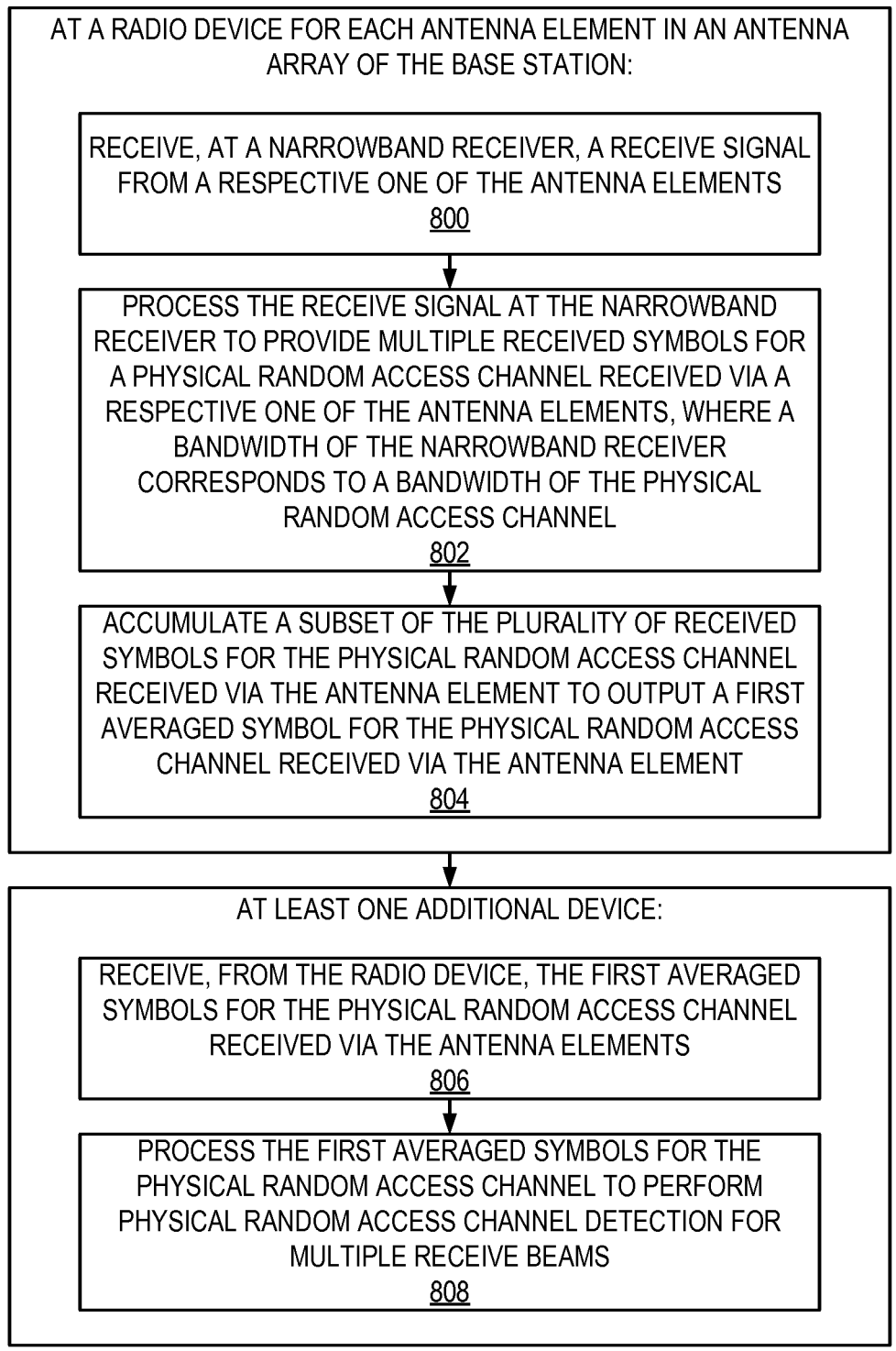
FIG. 8 is a flow chart that illustrates a method in a base station in accordance with some embodiments of the present disclosure.

FIG. 8 is a flow chart that illustrates a method in a base station in accordance with some embodiments of the present disclosure. As illustrated, the method comprises a number of steps performed at a radio device (e.g., the radio ASIC 508) and a number of steps performed at one or more additional devices (e.g., the beamforming ASIC 514 and the baseband ASIC 516). The method comprises, for each antenna element 600 of the antenna array 502 of the base station 500:

receiving, at a narrowband receiver, a receive signal from a respective one of the antenna elements (step 800);

processing the receive signal at the narrowband receiver to provide multiple received symbols (i.e., PRACH OFDM symbols) for a physical random access channel (i.e., PRACH) received via a respective antenna element (step 802), wherein a bandwidth of the narrowband receiver corresponds to a bandwidth of the physical random access channel; and accumulating a subset of the received symbols for the physical random access channel received via the antenna element to output a first accumulated output (i.e., a first averaged PRACH symbol) for the physical random access channel received via the antenna element (step 804).

The method further comprises, at the at least one additional device of the base station 500:

receiving, from the radio device, the first accumulated outputs for the physical random access channel received via the plurality of antenna elements (step 806); and processing the first accumulated outputs for the physical random access channel to perform physical random access channel detection for a plurality of receive beams (step 808).

Additional details regarding the method of operation of the base station 500 are described above with respect to FIGS. 5 through 7. As such, those details are not repeated here.

Note that, in some embodiments, the radio ASIC 508 is configured with control information and/or control information is signaled to the radio ASIC 508. For example, in some embodiments, this control information may include the number (N) of PRACH OFDM symbols to be aggregated, the number of aggregated PRACH symbols per PRACH preamble, a length of the PRACH OFDM symbols, and/or a start of PRACH detection. In some embodiments, the radio ASIC 508 sends an aggregation report to the baseband ASIC 516 or a control unit for baseband processing. This aggregation report may include information regarding how the aggregated PRACH symbols are interfaced to the beamforming ASIC 514 (e.g., delay, format, etc.).

Finally, it should also be noted that the systems and methods disclosed herein enable a split base station architecture (e.g., a split millimeter wave (mmW) base station architecture) where the where the interface, the needed control information, and the aggregated PRACH signal information all occur between radio heads close to the antennas and a baseband processing unit in a server not co-located to said radio heads (e.g., a server typically in the cloud).

Figure 9:
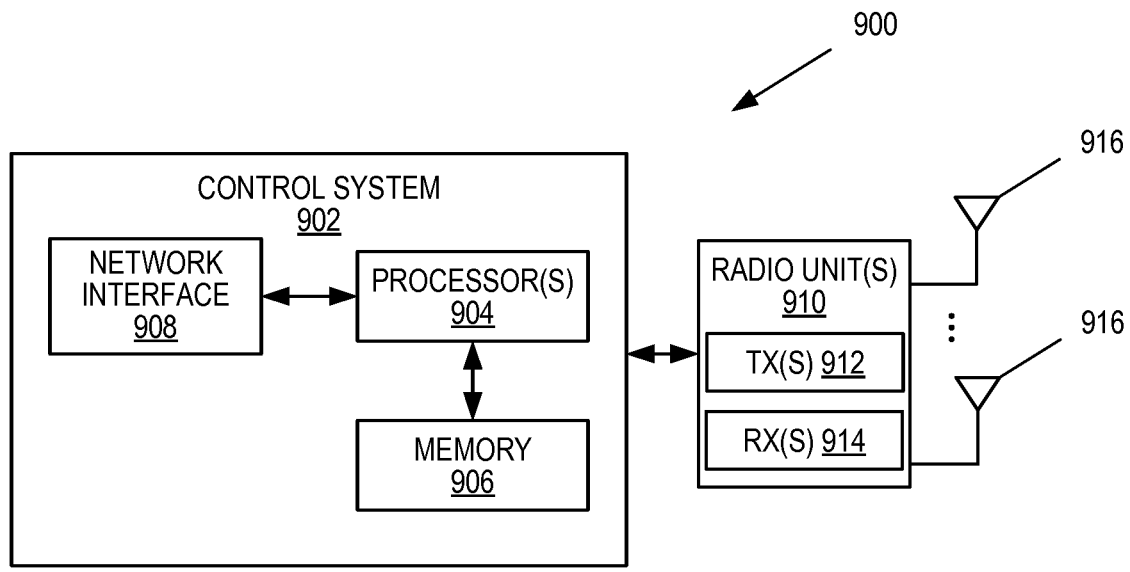
FIG. 9 is a schematic block diagram of a radio access node according to some embodiments of the present disclosure.

FIG. 9 is a schematic block diagram of a radio access node 900 according to some embodiments of the present disclosure. The radio access node 900 may be, for example, a base station 302 or 306. As illustrated, the radio access node 900 includes a control system 902 that includes one or more processors 904 (e.g., Central Processing Units (CPUs), ASICs, Field Programmable Gate Arrays (FPGAs), and/or the like), memory 906, and a network interface 908. In addition, the radio access node 900 includes one or more radio units 910 that each includes one or more transmitters 912 and one or more receivers 914 coupled to one or more antennas 916. In some embodiments, the radio unit(s) 910 is external to the control system 902 and connected to the control system 902 via, e.g., a wired connection (e.g., an optical cable). However, in some other embodiments, the radio unit(s) 910 and potentially the antenna(s) 916 are integrated together with the control system 902. The radio unit(s) 910 and the one or more processors 904 operate together to perform PRACH detection as described herein. For example, in some embodiments, the radio ASIC 508 is implemented in the radio unit(s) 910 whereas the beamforming ASIC 514 and the baseband ASIC 516 are implemented as part of the control system 902 (e.g., as part of the processors 904). In some embodiments, at least some of the function(s) of the base station described herein are implemented in software that is stored, e.g., in the memory 906 and executed by the one or more processors 904.

Figure 10:
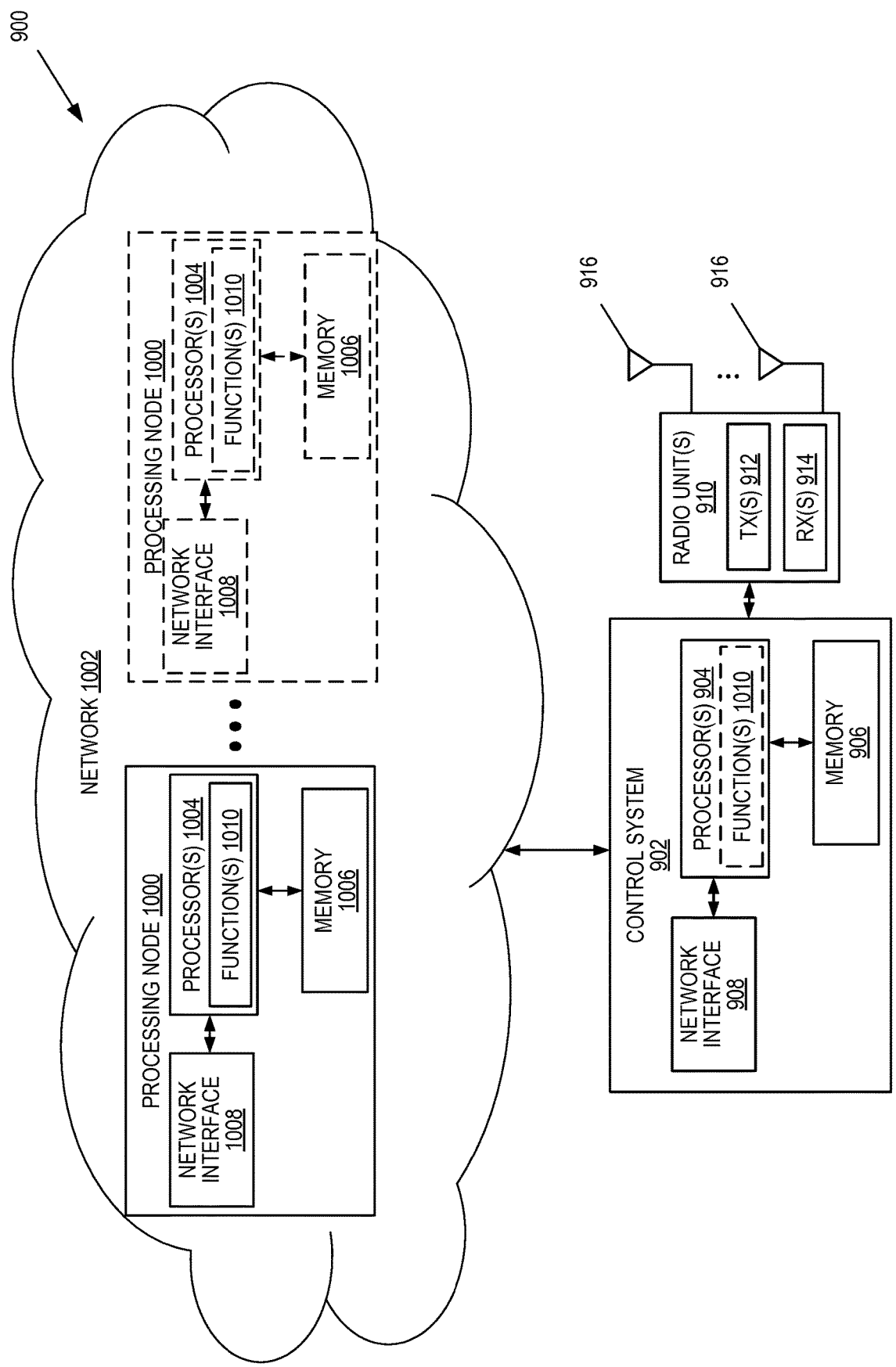
FIG. 10 is a schematic block diagram that illustrates a virtualized embodiment of the radio access node of FIG. 9 according to some embodiments of the present disclosure.

FIG. 10 is a schematic block diagram that illustrates a virtualized embodiment of the radio access node 900 according to some embodiments of the present disclosure. This discussion is equally applicable to other types of network nodes. Further, other types of network nodes may have similar virtualized architectures. As used herein, a "virtualized" radio access node is an implementation of the radio access node 900 in which at least a portion of the functionality of the radio access node 900 is implemented as a virtual component(s) (e.g., via a virtual machine(s) executing on a physical processing node(s) in a network(s)). As illustrated, in this example, the radio access node 900 includes the control system 902 that includes the one or more processors 904 (e.g., CPUs, ASICs, FPGAs, and/or the like), the memory 906, and the network interface 908 and the one or more radio units 910 that each includes the one or more transmitters 912 and the one or more receivers 914 coupled to the one or more antennas 916, as described above. The control system 902 is connected to the radio unit(s) 910 via, for example, an optical cable or the like. The control system 902 is connected to one or more processing nodes 1000 coupled to or included as part of a network(s) 1002 via the network interface 908. Each processing node 1000 includes one or more processors 1004 (e.g., CPUs, ASICs, FPGAs, and/or the like), memory 1006, and a network interface 1008.

In this example, at least some of the functions 1010 of the radio access node 900 described herein with respect to PRACH detection are implemented at the one or more processing nodes 1000 or distributed across the control system 902 and the one or more processing nodes 1000 in any desired manner. In some particular embodiments, some or all of the functions 1010 of the radio access node 900 described herein are implemented as virtual components executed by one or more virtual machines implemented in a virtual environment(s) hosted by the processing node(s) 1000. As will be appreciated by one of ordinary skill in the art, additional signaling or communication between the processing node(s) 1000 and the control system 902 and/or the radio unit(s) 910 is used in order to carry out at least some of the desired functions 1010. Notably, in some embodiments, the control system 902 may not be included, in which case the radio unit(s) 910 communicate directly with the processing node(s) 1000 via an appropriate network interface(s).

As an example, in some embodiments, the radio ASIC 508 is implemented in the radio unit(s) 910 whereas the functionality of the beamforming ASIC 514 and/or the baseband ASIC 516 is implemented at one or more of the processing node(s) 1000 or distributed across the control system 902 and one or more of the processing node(s) 1000.

In some embodiments, a computer program including instructions which, when executed by at least one processor, causes the at least one processor to carry out the functionality of radio access node 900 or a node (e.g., a processing node 1000) implementing one or more of the functions 1010 of the radio access node 900 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 11:
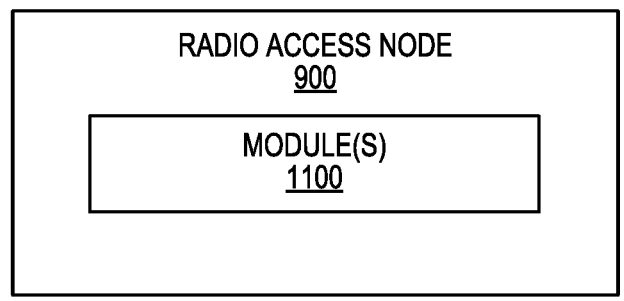
FIG. 11 is a schematic block diagram of the radio access node of FIG. 9 according to some other embodiments of the present disclosure.

FIG. 11 is a schematic block diagram of the radio access node 900 according to some other embodiments of the present disclosure. The radio access node 900 includes one or more modules 1100, each of which is implemented in software. The module(s) 1100 provide the functionality of the radio access node 900 described herein. This discussion is equally applicable to the processing node 1000 of FIG. 10 where the modules 1100 may be implemented at one of the processing nodes 1000 or distributed across multiple processing nodes 1000 and/or distributed across the processing node(s) 1000 and the control system 902.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
4G Fourth Generation
5G Fifth Generation
AP Access Point
ASIC Application Specific Integrated Circuit
CP Cyclic Prefix
CPRI Common Public Radio Interface
CPU Central Processing Unit
eNB Enhanced or Evolved Node B
FFT Fast Fourier Transform
FPGA Field Programmable Gate Array
GHz Gigahertz
gNB New Radio Base Station
IFFT Inverse Fast Fourier Transform
LTE Long Term Evolution
MME Mobility Management Entity
mmW Millimeter Wave
MTC Machine Type Communication
NR New Radio
OFDM Orthogonal Frequency Division Multiplexing
OTT Over-the-Top
P-GW Packet Data Network Gateway
PRACH Physical Random Access Channel
RAN Radio Access Network
RAR Random Access Response
RRH Remote Radio Head
SCEF Service Capability Exposure Function
SNR Signal to Noise Ratio
UE User Equipment Those skilled in the art will recognize improvements and modifications to the embodiments of the present disclosure. All such improvements and modifications are considered within the scope of the concepts disclosed herein.

The invention claimed is:

1. A base station for detecting a physical random access channel transmission from a User Equipment, UE, in a cellular communications network, comprising:
a radio device comprising:
a plurality of narrowband receivers respectively coupled to a plurality of antenna elements of an antenna array of the base station, each narrowband receiver of the plurality of narrowband receivers configured to:
receive a receive signal from a respective one of the plurality of antenna elements; and
process the receive signal to provide a plurality of received symbols for a physical random access channel received via the respective one of the plurality of antenna elements, wherein a bandwidth of each of the plurality of narrowband receivers corresponds to a bandwidth of the physical random access channel; and
accumulation circuitry configured to, for each of the plurality of antenna elements, accumulate a subset of the plurality of received symbols for the physical random access channel received via the antenna element to output a first averaged symbol for the physical random access channel received via the antenna element; and
at least one additional device configured to:
receive, from the radio device, the first averaged symbols for the physical random access channel received via the plurality of antenna elements; and
process the first averaged symbols for the physical random access channel to perform physical random access channel detection for one or more receive beams.

2. The base station of claim 1 wherein:
the subset of the plurality of received symbols for the physical random access channel is a first N received symbols of the plurality of received symbols for the physical random access channel;
wherein N is positive integer number that is greater than 1 and less than or equal to a total number of received symbols in the plurality of received symbols for the physical random access channel.

3. The base station of claim 1 wherein the accumulation circuitry is further configured to, for each of the plurality of antenna elements, accumulate a second subset of the plurality of received symbols for the physical random access channel received via the antenna element to output a second averaged symbol for the physical random access channel received via the antenna element.

4. The base station of claim 3 wherein:
the subset of the plurality of received symbols for the physical random access channel is the first N received symbols of the plurality of received symbols for the physical random access channel; and
the second subset of the plurality of received symbols for the physical random access channel is the next N received symbols of the plurality of received symbols for the physical random access channel;
wherein N is a positive integer number that is greater than 1 and less than or equal to ½ of a total number of received symbols in the plurality of received symbols for the physical random access channel.

5. The base station of claim 2 wherein N is configurable.
6. The base station of claim 2 wherein N is a variable value that is a function of one or more system parameters.
7. The base station of claim 6 wherein the one or more system parameters comprise in-band interference level.

8. The base station of claim 1 wherein the radio device is communicatively coupled to the at least one additional device via a communication interface.

9. The base station of claim 1 wherein the at least one additional device comprises:
   a second device that is communicatively coupled to the radio device via a communication interface, wherein the second device is configured to receive the first averaged symbols from the radio device via the communication interface.

10. The base station of claim 9 wherein the communication interface is a Common Public Radio Interface, CPRI.

11. The base station of claim 9 wherein:
   the second device is further configured to transform the first averaged symbols for the physical random access channel received via the plurality of antenna elements from the time domain to the frequency domain and the beam domain to thereby provide a per subcarrier output for each of the one or more receive beams; and
   wherein the at least one additional device is further configured to process the per subcarrier output for each of the one or more receive beams to perform physical random access channel detection for the one or more receive beams.

12. The base station of claim 11 wherein the at least one additional device comprises a third device configured to:
   receive the per subcarrier output for each of the one or more receive beams; and
   process the per subcarrier output for each of the one or more receive beams to perform physical random access channel detection for the one or more receive beams.

13. The base station of claim 12 wherein each of the first device, the second device, and the third device is either an Application Specific Integrated Circuit, ASIC, or a Field Programmable Gate Array, FPGA.

14. The base station of claim 11 wherein each of the first device and the second device is either an Application Specific Integrated Circuit, ASIC, or a Field Programmable Gate Array, FPGA.

15. The base station of claim 3 wherein the at least one additional device comprises:
   time domain to frequency domain transformation circuitry configured to, for each first averaged symbol of the first averaged symbols for the physical random access channel received via the plurality of antenna elements, transform the first averaged symbol from the time domain to the frequency domain to thereby provide a plurality of frequency-domain outputs, one for each subcarrier in the physical random access channel received via the respective antenna element of the plurality of antenna elements;
   beam transformation circuitry configured to transform the pluralities of frequency-domain outputs for the physical random access channel received via the plurality of antenna elements, respectively, from an antenna domain to a beam domain to thereby provide, for each subcarrier in the physical random access channel, a plurality of beam-domain outputs, one for each of a plurality of receive beam directions;
   matched filtering circuitry configured to, for each beam-domain output of the plurality of beam-domain outputs for each of the plurality of receive beam directions, perform matched filtering of the beam-domain output based on a frequency-domain representation of a random access symbol sequence for which detection is to be performed to thereby provided a matched filter output for each of the subcarriers in the physical random access channel for each of the plurality of receive beam directions;
   frequency domain to time domain transformation circuitry configured to, for each receive beam direction of the plurality of receive beam directions, transform the matched filter outputs for all of the subcarriers for the receive beam direction from the frequency domain to the time domain to provide a time-domain output for each receive beam direction; and
   circuitry configured to, for each receive beam direction, generate a magnitude squared of the time-domain output for the receive beam direction, thereby providing a first magnitude squared value for each of the plurality of receive beam directions;
   wherein:
      in the same manner, the time domain to frequency domain transformation circuitry, the beam transformation circuitry, the matched filtering circuitry, the frequency domain to time domain transformation circuitry, and the circuitry are further configured to process the second averaged symbols for the physical random access channel received via the plurality of antenna elements to thereby provide a second magnitude squared value for each of the plurality of receive beam directions; and
      the one or more additional devices further comprise:
         non-coherent combining circuitry configured to, for each receive beam direction of the plurality of receive beam directions, non-coherently combine the first and second magnitude squared values for the receive beam direction to thereby provide a combined time-domain output for the receive beam direction; and
         detection circuitry configured to perform physical random access channel on the receive beams based on the combined time-domain outputs for the one or more receive beams, respectively.

16. A method in a base station for detecting a physical random access channel transmission from a User Equipment, UE, in a cellular communication network, comprising:
   at a radio device, for each antenna element of a plurality of antenna elements of an antenna array of the base station:
      receiving, at a narrowband receiver, a receive signal from a respective one of the plurality of antenna elements;
      processing the receive signal at the narrowband receiver to provide a plurality of received symbols for a physical random access channel received via a respective one of the plurality of antenna elements, wherein a bandwidth of the narrowband receiver corresponds to a bandwidth of the physical random access channel; and
      accumulating a subset of the plurality of received symbols for the physical random access channel received via the antenna element to output a first averaged symbol for the physical random access channel received via the antenna element; and
   at one or more additional device:
      receiving, from the radio device, the first averaged symbols for the physical random access channel received via the plurality of antenna elements; and
      processing the first averaged symbols for the physical random access channel to perform physical random access channel detection for one or more receive beams.

17. The method of claim 16 wherein:
the subset of the plurality of received symbols for the physical random access channel is the first N received symbols of the plurality of received symbols for the physical random access channel;
wherein N is positive integer number that is greater than 1 and less than or equal to a total number of received symbols in the plurality of received symbols for the physical random access channel.

18. The method of claim 16 further comprising, at the radio device for each antenna element of the plurality of antenna elements of the antenna array of the base station:
accumulating a second subset of the plurality of received symbols for the physical random access channel received via the antenna element to output a second averaged symbol for the physical random access channel received via the antenna element.

19. The method of claim 18 wherein:
the subset of the plurality of received symbols for the physical random access channel is the first N received symbols of the plurality of received symbols for the physical random access channel; and
the second subset of the plurality of received symbols for the physical random access channel is the next N received symbols of the plurality of received symbols for the physical random access channel;
wherein N is positive integer number that is greater than 1 and less than or equal to ½ of a total number of received symbols in the plurality of received symbols for the physical random access channel.

20. The method of claim 17 wherein N is configurable.

21. The method of claim 17 wherein N is a variable value that is a function of one or more system parameters.

22. The method of claim 21 wherein the one or more system parameters comprise in-band interference level.

23. The method of claim 16 wherein the radio device is communicatively coupled to the one or more additional devices via a communication interface, the one or more additional devices comprise a second device that is communicatively coupled to the radio device via the communication interface, and receiving the first averaged symbols from the radio device comprises receiving the first averaged symbols from the radio device via the communication interface.

24. The method of claim 23 wherein the communication interface is a Common Public Radio Interface, CPRI.

25. The method of claim 23 wherein, at the one or more additional devices, processing the first averaged symbols for the physical random access channel to perform physical random access channel detection for the one or more receive beams comprises:
transforming the first averaged symbols for the physical random access channel received via the plurality of antenna elements from the time domain to the frequency domain and the beam domain to thereby provide a per subcarrier output for each of the plurality of received beams; and
processing the per subcarrier output for each of the plurality of received beams to perform physical random access channel detection for the one or more receive beams.

* * * * *

UNITED STATES PATENT AND TRADEMARK OFFICE
CERTIFICATE OF CORRECTION

PATENT NO. : 11,129,209 B2
APPLICATION NO. : 17/055575
DATED : September 21, 2021
INVENTOR(S) : Carlsson et al.

Page 1 of 1

It is certified that error appears in the above-identified patent and that said Letters Patent is hereby corrected as shown below:

In the Specification

In Column 12, Line 41, delete "IFFT 604-i" and insert -- IFFT 704-i --, therefor.

Signed and Sealed this
Eleventh Day of January, 2022

Drew Hirshfeld
*Performing the Functions and Duties of the*
*Under Secretary of Commerce for Intellectual Property and*
*Director of the United States Patent and Trademark Office*